July 5, 1955
A. P. D. STOKES
2,712,241
AUTOMATIC INSTRUMENT POSITIONING AND CONTROL APPARATUS
Filed June 3, 1952
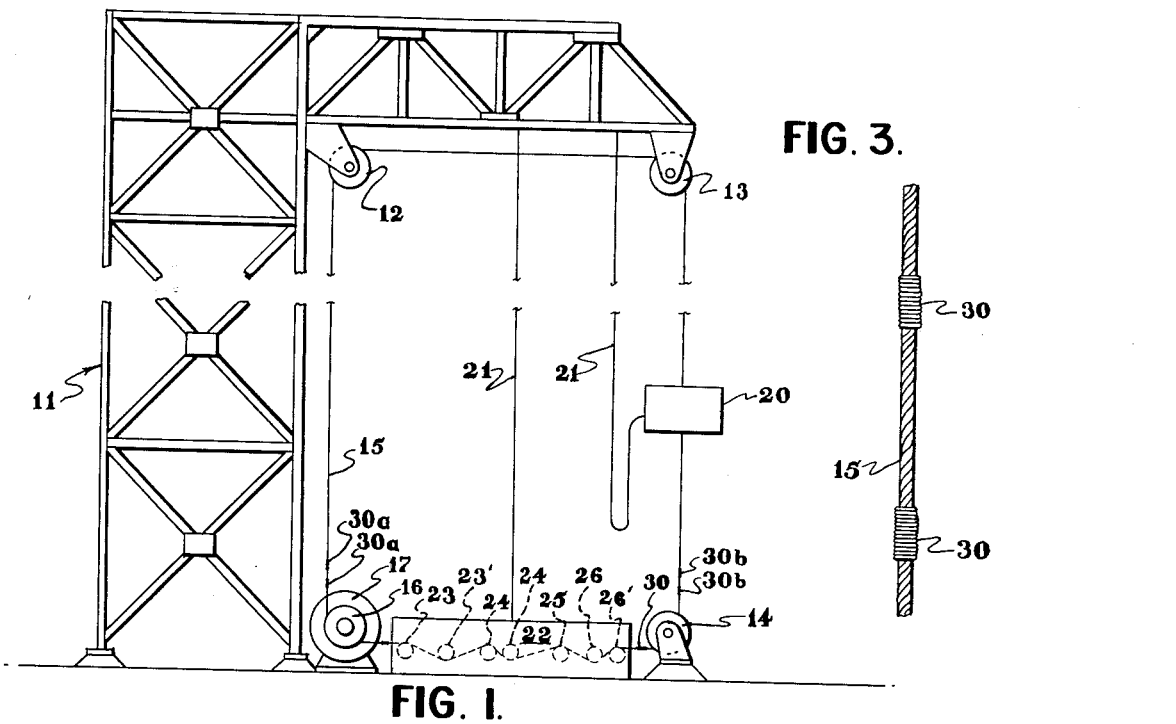
FIG. 3.
FIG. 1.
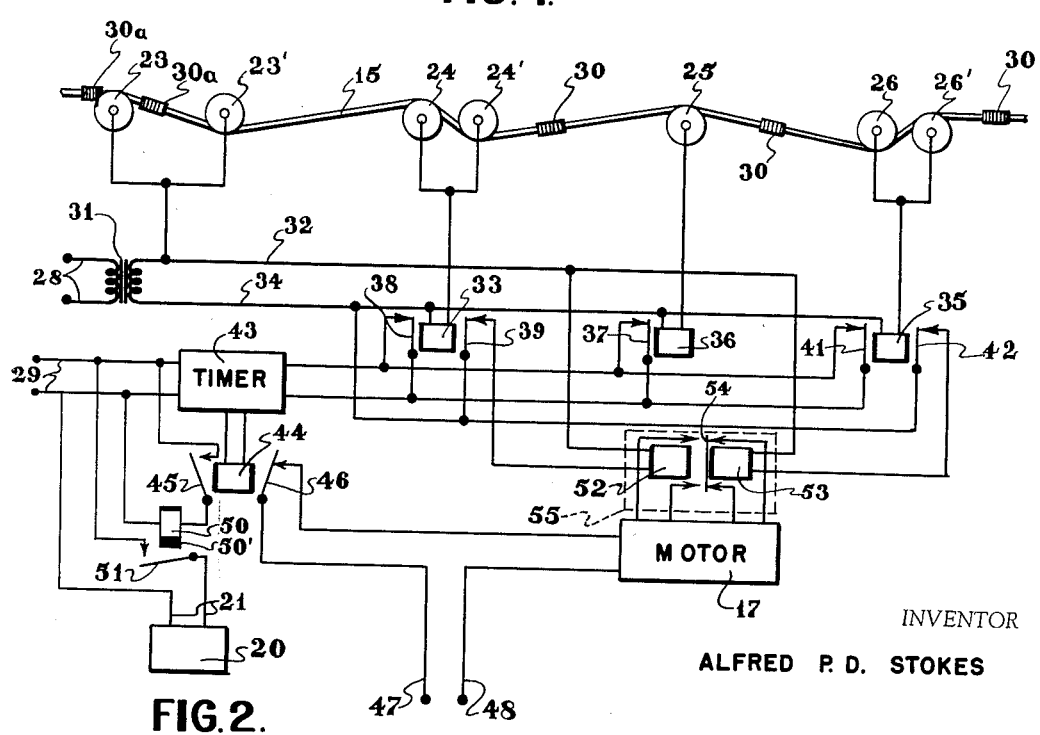
FIG. 2.
INVENTOR
ALFRED P. D. STOKES
BY George E. Pearson
ATTORNEY

United States Patent Office 2,712,241
Patented July 5, 1955

2,712,241

AUTOMATIC INSTRUMENT POSITIONING AND CONTROL APPARATUS

Alfred P. D. Stokes, Oakland, Calif.

Application June 3, 1952, Serial No. 291,585

16 Claims. (Cl. 73—432)

(Granted under Title 35, U. S. Code (1952), sec. 266)

The invention described herein may be manufactured and used by or for the Government of the United States of America for governmental purposes without the payment of any royalties thereon or therefor.

This invention relates generally to automatic instrument positioning and control apparatus, and more particularly, to a new and improved system for taking vertical profiles or measurements of temperature and dew point in the atmosphere.

It is an object of this invention to provide a system for automatically positioning a recording instrument in various selected positions for periodically recording values at these positions.

A further object is to control the progressing of a line or cable in accordance with preselected intervals of movement of the line or cable.

Still another object is to provide an automatic hoisting motor control means for periodically stopping, starting and/or reversing the motor.

A still further object is the provision of a data recording means whereby data may be recorded sequentially at selectively varied altitudes.

It is a further object of this invention to provide a new and improved apparatus for measuring atmospheric conditions in an accurate and facile manner.

Another object of this invention is to provide apparatus for automatically moving and positioning an instrument or other energizable object, and automatically energizing said instrument or other object after or simultaneously with its having been positioned.

A further object of the invention is to provide apparatus for automatically moving and positioning an energizable object and to automatically de-energize said object while it is moving and to automatically energize said object after or upon its having been positioned.

It is a further object to provide a cable-controlled system in which the cable serves the dual function of moving and holding a device and supplying energy for controlling the positioning of the device.

Other objects and many of the attendant advantages of this invention will be readily appreciated as the same becomes better understood by reference to the following detailed description when considered in connection with the accompanying drawings wherein:

Fig. 1 is a view in elevation of the recording instrument and control system;

Fig. 2 is a schematic diagram of the electrical control system; and

Fig. 3 is a detail view of the cable control line.

Referring now to the drawing, and more particularly to Fig. 1 thereof, a tower 11 is provided for supporting pulleys 12 and 13. Another pulley 14 is suitably arranged and mounted in position for passing a cable 15 over the pulleys and the power take-off or drive pulley 16 connected to an electric motor 17.

An instrument box 20 containing, for example, suitable recording mechanism (not shown) for measuring temperature and dew point or such other instruments or objects as may be desired, is secured to the line 15. In order to energize and de-energize the recording instruments in box 20, a two-cable conductor 21 inter-connects such instruments with a control system for said instruments, as will be described as the specification proceeds.

In order to position the instrument box at predetermined levels to obtain atmospheric conditions and values at discrete points for sufficient time periods to allow instrumental equilibrium, the motor 17 is started and stopped at predetermined intervals by means of the aforementioned control system.

This electrical control system may be suitably located in a housing 22, as shown in Figure 1. The system includes a plurality of control pulleys 23, 23', 24, 24', 25, 26 and 26' which are suitably rotatably mounted within and insulated from housing 22.

In the illustrated embodiment of the invention the cable 15 has non-conductive windings 30, 30a and 30b, suitably spaced thereon for causing the motor to stop at intervals and to cause reversals of the motor. This is accomplished by the spatial relationship between the windings and the various control pulleys. As shown in Figure 2, the cable 15 has both stop windings and stop-reverse windings. The stop windings 30 are arranged singly on the cable at spaced intervals while the stop-reverse windings 30a, 30a and 30b, 30b are arranged in pairs. It will be apparent, however, that a single long winding might be used in lieu of each of the pairs of windings 30a, 30a and 30b, 30b, if desired, the effective length of the stop-reverse windings being the governing factor. In the illustrated embodiment there are two pairs of stop-reverse windings 30a, 30a and 30b, 30b and arranged at spaced intervals between these two pairs of windings are the stop windings 30. The purpose and functions of the foregoing arrangement of windings will appear more particularly hereinafter as the description proceeds.

Trained over the pulleys 23—26', as shown in Figs. 1 and 2, is the cable 15 which is electrically conductive, being formed for this purpose of any suitably stranded metal wire and which through various ones of the control pulleys serves to complete various circuits in the motor control system.

Referring to Fig. 2, it will be apparent that stop control pulley 25 when in contact with cable 15 completes a circuit through relay 36, line 34, secondary of transformer 31, line 32, one or both of control pulleys 23, 23', cable 15 and back to pulley 25. Current is supplied to this circuit from transformer 31, the primary of which receives power from a pair of leads 28. Thus, when power is supplied to these leads, energization of this circuit causes relay 36 to hold open normally closed contact 37.

Arranged on either side of the stop control pulley 25 are a pair of stop-reverse pulleys 24, 24' and 26, 26'. Each of these pairs of stop-reverse pulleys are spaced apart the same distance as their respective stop-reverse windings 30a, 30a and 30b, 30b. Further, the pulleys 23 and 23' are spaced apart a distance unequal to the distance between any two or more of the stop or stop-reverse windings so that there will always be a contact between cable 15 and either control pulley 23 or 23', or both. For example, in the illustrated embodiment of the invention the control pulleys 23 and 23' are spaced further apart than the greatest distance between the outer ends of each of the windings 30a, 30a, and are less distance apart than the distance between the adjacent ends of any two adjacent stop windings 30. In order for the contacts between cable 15 and each of the pairs of stop-reverse pulleys 24, 24' and 26, 26' will not be broken by a single stop winding 30, the stop-reverse pulleys in each pair are spaced apart from each other a distance greater than the length of any stop winding 30. Thus, when either or both of stop-reverse pulleys 24, 24' are in contact with cable 15, a circuit is completed through relay 33, line 34, secondary of transformer 31, line 32, either or both of pulleys 23, 23', cable 15, and back to either or both of pulleys 24, 24'. The energization of relay 33 causes normally closed contacts 38 and 39 to be held open. Similarly, when either or both of pulleys 26, 26' are in contact with cable 15, a circuit is completed through relay 35 and either or both of pulleys 23, 23' which thus holds open normally closed contacts 41 and 42.

Assume that energy is now supplied to leads 28, 29, 47 and 48 with cable 15 in the position illustrated in Fig. 2. In this circuit condition, relays 33, 35 and 36 will be energized and their respective contacts will be open and the motor will progress the cable 15 over the pulleys. In order to stop the motor for a selected period of time, a timer shown symbolically at 43 is provided which, when energized, in turn energizes a relay 44 having normally open contact 45 and normally closed contact 46. The timer 43 may be of any known design, as for example, a conventional photo timer, or any of many other types which will be obvious to those skilled in the art, and is not further described herein as the details thereof do not form a part of the invention.

Upon a breaking of contact between cable 15 and stop control pulley 25 by the passage therebetween of a stop winding 30, the relay 36 is de-energized, allowing contact 37 to close, thereby completing a circuit from supply leads 29 through timer 43 and relay contact 37. This energizes the timer 43 which, upon starting, in turn energizes for a selected period of time relay 44, causing contact 46 to open and contact 45 to close. The opening of contact 46 breaks the circuit from supply leads 47, 48 to the motor 17, thus causing it to stop. Simultaneously contact 45 is closed thereby energizing time delay relay 50 which may be a slow operate telephone type relay having a copper slug 50'. After a predetermined time delay, relay 50 closes contact 51 to thereby energize the instruments in instrument box 20 from supply leads 29.

The time delay relay is interposed so that the instruments will have sufficient time to reach equilibrium before actuation thereof, thus insuring accuracy of measurement and recording. It will be apparent to those skilled in the art that if an instrument should be used which required no stabilization before recording its reading, or if another object were positioned and required no stabilization period, the time delay relay 50 might be eliminated and the instrument or other object energized directly upon the closing of contact 45, in which case the instrument or other object might be in the same circuit with contact 45.

Upon the passage of the predetermined period of time for which the timer 43 is set, the relay 44 is de-energized, allowing the closing of contact 46 and the opening of contact 45. The instruments in the instrument box 20 are thus de-energized and simultaneously the motor 17 is started, causing the cable 15 to be fed along again in the same direction for reasons which will become more clearly apparent as the description proceeds. The progressing of the cable 15 causes the stop winding 30, which it will be recalled had moved between cable 15 and pulley 25, to be progressed past the stop control pulley 25, thus re-establishing contact between the pulley 25 and the cable 15. This re-energizes relay 36, opens contact 37, and de-energizes timer 43.

The motor 17 will thus continue to run and progress the cable 15 until a second stop winding 30 breaks the contact between cable 15 and stop control pulley 25, at which time the above cycle is repeated, or until a pair of stop-reverse windings 30a, 30a or 30b, 30b break the contact between the stop control pulleys 24, 24' or stop control pulleys 26, 26', respectively, depending on which direction the motor is turning. Upon the breaking of the contact between either pair of the stop-reverse pulleys 24, 24' or 26, 26' and cable 15, the stop-reverse operation will be commenced, which operation will next be described.

Assuming that the motor 17 is turning in such a direction as to cause cable 15 to be fed from left to right as seen in Fig. 2, after all of the stop windings 30 have progressed past the stop control pulley 25, the stop-reverse windings 30a, 30a have progressed past the pulleys 23, 23' and continue to be progressed until contact is broken between stop-control pulleys 24, 24' and cable 15 by the passage of stop-reverse windings 30a, 30a therebetween. The breaking of contact between pulleys 24, 24' and cable 15 de-energizes relay 33, whereupon contacts 38 and 39 are closed. The closing of contact 38 completes the circuit for energization of the timer 43 in a similar manner to the completion of the timer energizing circuit through contact 37 as previously described in connection with a simple stop operation, and inasmuch as the operation of the timer is the same in each case the description of this operation is not repeated at this point. It will suffice to again point out that the timer causes the motor to stop for a selected period of time, and also causes the instruments in instrument box 20 to be energized after a short delay interval. The closing of contact 39 completes a circuit through a reversing electromagnet 52, line 32, secondary of transformer 31, line 34, and back to contact 39. Reversing electromagnet 52 is one of a pair of reversing relays 52, 53 which control a reversing switch contact 54 in what may be a conventional polarity switch, generally designated at 55, or other suitable reversing mechanism as desired. Previous to this energization of reversing electromagnet 52, the motor 17 will have been turning in a direction so as to feed the cable 15 from left to right (as seen in Fig. 2), and in so doing the switch contact 54 of polarity switch 55 will have been in contact with the pair of line contacts adjacent electromagnet 53. The energization of electromagnet 52 causes the switch contact 54 to be attracted into contact with the pair of line contacts adjacent electromagnet 52, and upon the subsequent closing of contact 46 the motor 17 will turn in the opposite direction to that in which it previously turned. In other words, the cable will then be fed or progressed from right to left as seen in Fig. 2. The switch contact 54 will remain in this position until such time as all of the stop windings 30 have passed stop pulley 25 and the other pair of stop-reverse windings 30b, 30b have broken the contact between stop-reverse control pulleys 26, 26' and cable 15, at which time a stop-reverse cycle similar to the one above described will take place through the de-energization of stop-reverse relay 35, and the consequent energization of reversing electromagnet 53, and energization of timer 43 through the closing of contact 41. Thus, when contact 46 again closes, contact 54 will be in position to reverse the motor and cable 15 will again be caused to progress from left to right. The above described cycle of operation is completely automatic and may be repeated as many times as desired.

It will be seen from the foregoing description that this invention provides a novel means whereby an instrument or other desired object may be automatically moved from one of a plurality of preselected positions to another, stopped, and energized either immediately or after a time delay, and again moved to a successive position and the cycle repeated, and whereby reversal of the moving motion will be accomplished at the end of a predetermined distance of travel, this cycle being repeated for a reverse period of travel, the entire cycle being repeated as many times as desired. It will also be apparent from the foregoing description that the instruments are held stationary at each predetermined stop point, including the reversing point, so that recording of an instrument reading may be made at each point.

Obviously many modifications and variations of the present invention are possible in the light of the foregoing teachings. It is therefore to be understood that within the scope of the appended claims the invention may be practiced otherwise than as specifically described.

What is desired to be secured by Letters Patent of the United States is:

1. A control for a motor comprising a movable conductive line, a contact member over which and in contact with which said conductive line may move, an electrical control circuit for said motor, means connected to said motor for moving said movable conductive line, said movable conductive line and said contact member being a part of said electrical control circuit for said motor, means for breaking the contact between said movable conductive line and said contact member, and means for stopping said motor, said last named means being operable to stop said motor in response to said breaking of contact.

2. A motor control as defined in claim 1 in which said last named means comprises a timer mechanism operatively connected to said contact member, said timer mechanism being operable in response to said breaking of contact to stop said motor for a selected period of time and to start said motor at the end of said period of time.

3. A motor control as defined in claim 1 in which said last named means comprises a relay operatively connected to said contact member, said relay being operable in response to said breaking of contact to stop said motor.

4. A motor control as defined in claim 1 wherein means are provided to reverse said motor upon the completion of a predetermined travel of said conductive line.

5. A control for a motor comprising a movable conductive member, a contact member over which and in contact with which said conductive member may move, an electrical control circuit for said motor, means connected to said motor for moving said movable conductive member, said movable conductive member and said contact member being a part of said electrical control circuit for said motor, means for breaking the contact between said movable conductive member and said contact member, means for stopping said motor, said last named means being operable, to stop said motor in response to said breaking of contact, means to reverse said motor upon completion of a predetermined travel of said conductive member, said last named means comprising at least a second contact member over which and in contact with which said conductive member passes, and a reversing switch operatively connected between said motor and second contact means, said switch being operable in response to breaking of contact between said conductive member and second contact member to reverse the direction in which said motor will turn.

6. A motor control as defined in claim 5 in which said conductive member is an electrically conductive cable and said contact members are electrically conductive pulleys over which said cable is passed.

7. A control for a motor comprising a movable conductive member, a contact member over which and in contact with which said conductive member may move, an electrical control circuit for said motor, means connected to said motor for moving said movable conductive member, said movable conductive member and said contact member being a part of said electrical control circuit for said motor, means for breaking the contact between said movable conductive member and said contact member, and means for stopping said motor, said last named means being operable to stop said motor in response to said breaking of contact, said conductive member being an electrically conductive cable and said contact member being an electrically conductive pulley over which said cable passes.

8. An instrument positioning and control apparatus comprising a support, a conductive cable movably supported on said support, said cable being secured to a bodily movable instrument for movement of said instrument, at least one electrically conductive contact member over which and in contact with which said cable passes, said cable having a non-conductive covering over a portion thereof for breaking the contact between said cable and said contact member, a relay connected in series with said cable, contact member and a source of current whereby said relay is energized when said cable and contact member are in contact and said relay is de-energized when said contact is broken, and means responsive to the de-energizing of said relay for stopping said cable.

9. An instrument positioning and control apparatus as defined in claim 8, wherein there is further provided means operable responsive to the de-energizing of said relay to energize said instrument.

10. The invention as described in claim 9 wherein said last named means includes a timing mechanism for selectively controlling the length of time said instrument is energized.

11. The invention as described in claim 10 wherein said last named means includes a time delay means operable to delay energization of said instrument for a selected period of time after said breaking of contact between said contact member and said cable.

12. A positioning and control apparatus comprising a control pulley, an electrically conductive line trained over and in contact with said pulley, timing means, means on said line and movable onto the pulley to break said contact, first relay means operably connected to said pulley and operable to energize said timing means in response to breaking of contact between said pulley and said line, a motor arranged in driving relation to said line, and on-off control means for said motor, said on-off control means being controlled by said timing means and operable in response to energization of said timing means to cut-off said motor, said means for breaking the contact between said line and control pulley being arranged on the line at selected intervals thereon.

13. The invention as described in claim 12 wherein there is provided second and third pulleys over which said line is trained, means responsive to a breaking of contact between said second and third pulleys and said line to energize said timing means and to reverse the direction of said motor.

14. The invention as described in claim 13 wherein there is provided means responsive to breaking of contact between said line and either said first or said second and third pulleys to energize said instrument.

15. The invention as described in claim 14 wherein said last named means includes a time delay means.

16. A control system comprising an energizable movable line, first and second circuit breaking means arranged at spaced intervals on said line, a first pair of contact members, a second pair of contact members, a single contact member, said contact member and pairs of contact members being arranged at spaced intervals and having said line trained over each of said members, a first circuit including said line, said first pair of contact members and said second pair of contact members, and a second circuit including said first pair of contact members, said line and said single contact member, said first pair of contacts being spaced apart from one another a distance unequal to the spaced apart distance between each of said second pair of contacts, said first circuit breaking means being of a length less than the distance between any two of said contact members and of effective length equal to or greater than the distance over which said single contact member and line are in contact whereby said first circuit breaking means is operable to control said second circuit and inoperable to control said first circuit, said second circuit breaking means being of an effective length equal to or greater than the effective distance between said second pair of contact members whereby said second circuit breaking means controls said first circuit.

References Cited in the file of this patent

UNITED STATES PATENTS

| | | |
|---|---|---|
| 2,077,317 | Gerace | Apr. 13, 1937 |
| 2,290,626 | Bosomworth | July 21, 1942 |
| 2,367,363 | Matt | Jan. 16, 1945 |
| 2,394,220 | Wagner | Feb. 5, 1946 |
| 2,430,538 | Somers | Nov. 11, 1947 |
| 2,576,903 | Imm | Nov. 27, 1951 |